United States Patent

[11] 3,633,289

[72] Inventor Jack W. Hannah
 700 Grace Street, Mansfield, Ohio 44901
[21] Appl. No. 875,718
[22] Filed Nov. 12, 1969
[45] Patented Jan. 11, 1972

[54] RECORDING DEVICE OF STUDENT LEARNING PROCESS
 12 Claims, 3 Drawing Figs.

[52] U.S. Cl...................................................... 35/48 R,
 346/33 S, 346/74 SB
[51] Int. Cl........................................................ G09b 5/00
[50] Field of Search............................................ 35/8, 9, 48
 R, 48 B; 346/74 SB, 33 R, 33 S, 103, 125, 132;
 40/78.05

[56] References Cited
 UNITED STATES PATENTS
 3,172,216 3/1965 Mueller......................... 35/48
 3,224,008 12/1965 Hawley......................... 346/74 SB
 3,296,727 1/1967 Liguori......................... 40/78.05 X
 3,434,149 3/1969 Brousseau et al............. 346/74 SB X
 3,452,449 7/1969 Mitchell....................... 35/9

Primary Examiner—Wm. H. Grieb
Attorney—Sherman and Shalloway

ABSTRACT: A branched teaching machine that selects frames for presentation to the student in accordance with individualistic responses is connected to the remote control of a rotatable slide projector and causes the slide projector to move either forward or reverse in step with its search for the frame to be selected and presented. As the frame is presented, a slide in the slide projector may also be shown. As a primary feature of this invention, a printed paper record, attaChed to the rotatable tray, and giving a frame-by-frame resume of the teaching machine's branched programs, is electrically marked at all frames viewed by the student. Hence, a permanent, readily readable record is provided which can be used by a teacher to diagnose the path the student took in going through the teaching machine program.

PATENTED JAN 11 1972  3,633,289
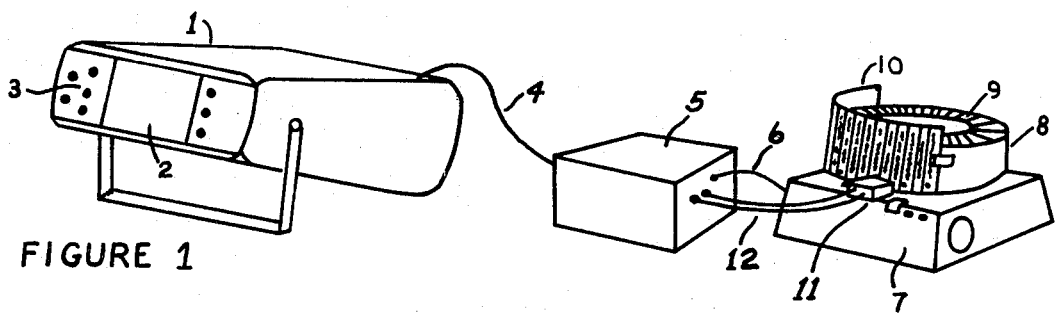
FIGURE 1
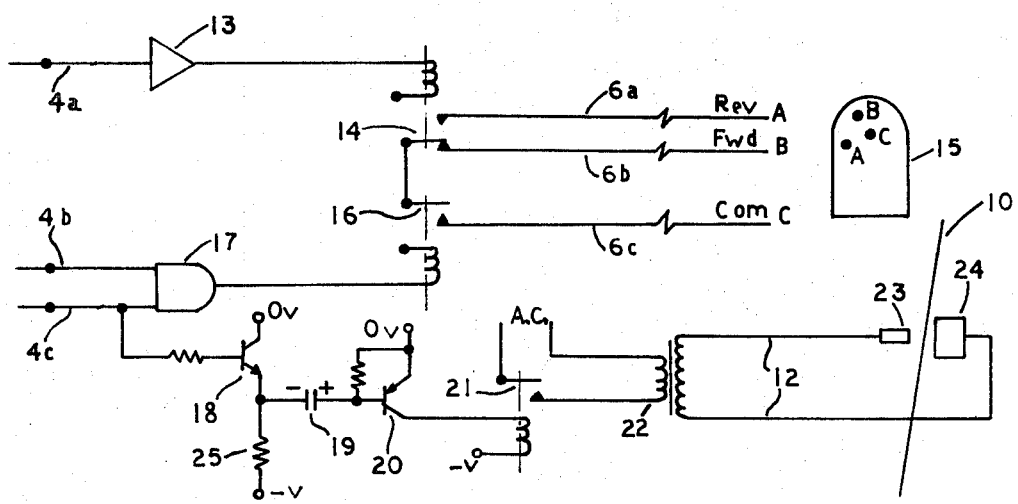
FIGURE 2
| 1 | Title Frame – Addition | 1 • |
|---|---|---|
| 2 | Info-example, arrangement of numerals | 2 • — 26 |
| 3 | Ques. Arrange 41 + 3256 | 3 • |
| 4 | Wrong ans. to 3. Put 4 under 3, ⟶ 2 | 4 |
| 5 | Wrong ans. to 3. Put 4 under 6, ⟶ 2 | 5 |
| 6 | Ans. 3 OK. Ques. Arrange 527 + 190 | 6 • — 26 |
| 7 | Wrong ans. to 6. Put 1 under 2, ⟶ 8 | 7 • |
FIGURE 3
JACK W. HANNAH INVENTOR.
BY *Sherman & Shalloway*

RECORDING DEVICE OF STUDENT LEARNING PROCESS

There are several varieties of teaching machines which "branch" a student through a program. Briefly, such machines handle a film strip or microfiche card which contains numerous presentations or frames. Some of these frames present information to the student and move off the presentation to another frame whenever the student responds by pressing some specific button (one machine automatically moves off certain of its frames after some preset period of time). Others of the frames contain a question with multiple choice answers; the student picks the answer he thinks is correct and presses a response button corresponding to this answer. Still other frames contain corrective information so that whenever a wrong answer is chosen one of these frames is shown to help the student better understand his specific error. Thus, it is evident that a program on one of these types of teaching machines will have frames on its film strip or microfiche card that a student may never see because his responses never require their corrective or supplementary information. Two students going through the same program will normally not see an identical sequence of frames because they will misunderstand different areas of the program and be given different corrective or remedial frames.

Such a teaching machine and its program is basically designed for individualized instruction, and the student succeeds and learns by answering questions and seeing reinforcing frames when he is right or seeing corrective frames when he is wrong. He may be forced by the teaching machine and its program to go back over material where his answers show weak comprehension. Thus, the very fact that he finally completes a program shows that he has learned (or that he is a very lucky or patient guesser). Nevertheless, it is often very desirable for an instructor to be able to know just where a student had difficulties while going through a program on a teaching machine. The device of this invention provides a simple means whereby such a record can be obtained. It consists of a sheet of paper attached to the tray of a slide projector, which can be of the type manufactured by the Eastman Kodak Company and marketed under the trademark "Kodak Carousel." The description of the device that follows will be made in conjunction with such a slide projector since same is readily available on the market and adaptable to the device of this invention.

The paper connected to the tray of the projector contains a digest of the contents of each frame (limited to 80 frames when using a Kodak Carousel Slide Projector which has 80 slide compartments around its tray). Each digest on the paper is spaced so as to fall in the area of one slide compartment.

The paper record is attached to the tray so that it moves whenever the slide projector tray moves. The projector tray is made to move in step with the film movement of the teaching machine. Whenever the teaching machine stops moving its film and makes the presentation of a frame, the tray stops its circular movement and the area of paper at the slide compartment positioned for a slide presentation is electrostatically marked. Hence, since the tray is slaved to the selective movements of the teaching machine and since the paper with its digest of program contents is attached to the tray, and since whenever the tray stops a mark is made on the paper, there thus is produced on the paper a series of marks that show just which frames were viewed by the student.

Besides a record of student progress through a program, there are other applications served by this invention. Recent attention has been given to means for automatic acquisition of patient history in the field of medicine. A series of frames shown a patient ask questions about his medical history. Certain of his answers cause a number of the questioning frames not to be shown at all as unrelated to a particular patient. Thereby, the presentation of questions is in many ways similar to the teaching process of the aforementioned teaching machines. But when the patient does give a relevant response, as, for example, by saying "Yes" to the question, "Have you had dizzy spells within the past six months?" then a device of the subject invention would mark this question on the paper. The physician would thus have a readable record of the patient's responses made to the questions asked on the machine.

A detailed description of this invention follows with reference to the figures wherein:

FIG. 1 shows a teaching machine interfaced with and controlling a circular slide projector on which is affixed a paper card for receiving a record of responses made on the teaching machine;

FIG. 2 shows a schematic diagram of the device which interfaces outputs from the teaching machine to control movement of the slide projector and mark any record paper attached thereto;

FIG. 3 shows a portion of a typical sheet of record paper and the spacing of the digest of frame content thereon, plus typical appearance of marks made whenever a frame is presented to the student.

Looking then at FIG. 1 the teaching machine 1 sets before a student who studies presentations made on its screen 2. The student responds to these presentations by pressing one of the several pushbuttons 3. (For detailed descriptions of the operations of one such teaching machine refer to U.S. Pat. No. 3,191,315 of J. W. Hannah issued June 29, 1965). Within the machine 1, there is a film strip which contains a number of different frames. The selection of a particular frame is made by the teaching machine moving the film strip past frames either in a forward direction or a reverse direction. The amount of movement is governed by logic determined ultimately by the manner in which the film strip is programmed and the particular pushbutton 3 actuated by the student. Thus, the student may be looking at the fifth frame on the film strip and will push a button causing a determination to be made to skip him past the sixth and seventh frames and present the eighth frame. Or, he may choose a button which causes the strip to go in reverse to frame two, skipping past frames four and three.

Thus, the teaching machine is capable of providing three important signals concerning the movement of the frames on its filmed program. It can tell whether the film is advancing forward on frames or going back over frames (forward or reverse); it can indicate the moment it reaches each frame (even though it may pass such a frame by and not stop there); and it can indicate when it does stop at a frame and is proceeding to make a presentation. These signals are shown being taken from the teaching machine on wires 4, to the control box 5 (contents of the control box 5,—the interface—are principally shown in FIG. 2). Leads 6 go from the control box 5 and are plugged into the remote control receptacle of the slide projector 7. This slide projector has a turret tray 8 containing compartments 9 into which slides may be inserted. This turret tray is capable of revolving either clockwise or counterclockwise as directed by built-in mechanisms which may be actuated by remote contact closures. These closures are being made in the device of box 5 through leads 6.

Affixed to the tray 8 is a record card 10. Fastened to the body of the projector is a spark generator (i.e., a pair of electrodes) 11 which electrically by means of high voltage punches a hole through the paper record card 10, thus marking it. The current to produce this spark comes from box 5 through leads 12.

Of course, wherever the teaching machine 1 stops film movement in order to present a frame, the slide projector tray will stop as well and a slide located in its compartment of the tray 8 will be projected. This can be a source of supplementary visual presentation to accompany the teaching machine.

The schematic of FIG. 2 shows the three wires 4a, 4b, and 4c which are outputs from the teaching machine and inputs to the control box 5 which controls the slide projector tray. A signal on wire 4a indicates the movement of the film in the teaching machine is in a reverse direction. This signal is amplified in the amplifier 13 in order to actuate the relay contact 14. If the relay contact 14 is not actuated, contact is maintained on the lead 6b which goes into the B-pin of the plug 15 that fits into the remote control receptacle of the slide projector tray. Signals on this B-pin cause the tray to rotate forward, i.e., from a compartment bearing a low numeral towards compartments bearing higher numerals. On the other hand, when contact 14 is actuated because the teaching machine is moving in reverse, then contact is made on lead 6a which goes into the A-pin of plug 15, causing the tray to rotate in reverse.

The stepping mechanism of a Kodak Carousel Slide Projector operates in the forward direction for one step (i.e., from one slide compartment 9 to an adjacent slide compartment) when leads 6c and 6b are brought into contact for a fraction of a second. It operates in the reverse direction for one step when leads 6c and 6a are brought into contact for a fraction of a second. Hence, it is readily seen that lead 6c is the common. It has already been explained in the previous paragraph how determination is made as to whether lead 6a or 6b will be used to carry a signal to a Kodak Carousel Slide Projector. The purpose of the relay contact 16 is to momentarily close and cause rotation of the tray for one step. Relay contact 16 is actuated by the output of AND-gate 17 which is actuated whenever a signal appears on leads 4c and 4b. A signal on lead 4c appears whenever the teaching machine is moving its film strip, and a momentary signal appears on 4b at the instant each frame of the film strip is reached. Therefore, when the film strip moves to a new frame to make a presentation by passing three other frames on the film strip, there will be a continuous signal on lead 4c while the movement occurs and four momentary signals on lead 4b as the three other frames are passed and the fourth frame is reached and settled upon. The combinations of signals cause four output pulses from AND-gate 17 which actuate and release relay contact 16 four times which cause four closures to the remote control mechanism of a Kodak Carousel Slide Projector, which rotates the tray 8 four steps. Hence, the tray rotation is stepped or slaved to the film motion of the teaching machine.

Whenever the teaching machine finally stops, the signal on lead 4c is changed in voltage level which changes the output of transistor 18. This produces a signal through the coupling capacitor 19 to activate the transistor 20. The length of time of the activation is a factor of the size of the capacitor 19 and the resistor 25. Hence, there is a momentary input to the base of transistor 20 whenever the teaching machine stops on a frame to present it to the student. As explained above, the tray will have rotated to a slide compartment corresponding to such a frame. The output of transistor 20 momentarily operates the relay contact 21, which places 110 volt AC line voltage on the primary of the transformer 22. The secondary of the transformer 22 produces a high voltage in the order of 2,000 volts which appears for a very brief fraction of a second. This is conducted to electrodes 23 and 24 which are affixed to the side of the slide projector as shown in FIG. 1 at item 11. The record paper or card 10, which is secured to the tray and moves with its rotation, slides between the electrodes 23 and 24. Whenever the high voltage appears, a small hole is burned into the paper, producing a readily distinguishable mark.

FIG. 3 illustrates a typical record card that would be taped or otherwise affixed to the tray. It is divided by lines spaced to correspond to the circumferential distance between slide compartments of the tray. In the space between the lines are words which identify the content of the corresponding frame on the sequence of frames of the programmed film strip used in the teaching machine. This wording is not, of course, the whole content of the words on a frame but enough to give the teacher the gist of the frame. The burn holes appear as marks along the edge of the record card, as shown by items 26. It thus becomes evident when looking at the record card illustrated in FIG. 3 that the student was presented frames 1, 2, 3, 6 and 7, but skipped frames 4 and 5. This is readily interpreted that the student did not miss the question presented at frame 3 because he was not presented either of the corrective frames 4 or 5. On the other hand, he did miss the question at frame 6, having chosen an answer as indicated by the presentation of frame 7 that in adding 527+190 the numbers are arranged as

527
+190
___

Although a preferred embodiment of the invention has been described in detail, it is to be understood that various changes, substitutions and alterations can be made therein without departing from the spirit and scope of the invention as defined by the appended claims.

What is claimed is:

1. For use with a teaching device, recording apparatus comprising a movable member, means for moving said member discrete steps in forward and reverse directions and adapted to be activated by electrical signals from the teaching device, means for attaching record material to said member, and means for marking the record material with a high-voltage electrical charge whereby the record material is marked when said member is moved to a specified position as determined by the teaching device.

2. The recording apparatus as recited in claim 1 wherein said recording apparatus includes a slide projector having a movable tray defining said movable member.

3. The recording apparatus as recited in claim 2 wherein said tray is circular and is rotatably movable.

4. The combination comprising a slide projector having a movable tray for receiving slides, control means adapted to receive electrical signals from a controlling source to selectively move said tray, means for attaching record material to said tray and means adapted to receive the electrical signals from the controlling source to mark the record material in response thereto.

5. The combination comprising a teaching device including means for selectively moving a film to predetermined frames, and signal generating means for providing electrical signals corresponding to operation of said film moving means; and recording apparatus including a movable member, means for attaching record material to said movable member, control means connected with said signal-generating means to drive said movable member in response to said electrical signals, and marking means connected with said signal generating means to mark said record material at specified positions corresponding to said predetermined frames in response to said electrical signals.

6. The combination as recited in claim 5 wherein said electrical signals include first signals representing the direction of movement of said film and second signals representing the status of said film as being moving or stationary, said control means receives said first signals to control the direction of movement of said movable member in the same direction as said film, and said marking means receives said second signals to mark said record material when the movement of said film stops.

7. The combination as recited in claim 6 wherein said marking means includes a timing circuit responsive to said second signals to mark said record material only once after the movement of said film stops.

8. The combination as recited in claim 7 wherein said marking means includes means responsive to said timing circuit for providing a high-voltage spark to mark said record material.

9. For use with a teaching device having a film selectively movable to predetermined frames and providing electrical signals corresponding to movement of the film, recording apparatus comprising a movable member, means for attaching record material to said movable member, control means for receiving the electrical signals from the teaching device to drive said movable member in response to the electrical signals, and marking means for receiving the electrical signals from the teaching device to mark the record material at specified positions corresponding to the predetermined frames in response to the electrical signals.

10. The recording apparatus as recited in claim 9 wherein the electrical signals provided by the teaching device include first signals corresponding to the direction of movement of the film and second signals representing the status of the film as being moving or stationary, said control means being adapted to receive the first signals from the teaching device and including means for driving said movable member in a direction corresponding to the direction of movement of the film in the teaching device, and said marking means being adapted to receive the second signals and responsive thereto to mark the record material in response to the second signals representing the film as being stationary.

11. The recording apparatus as recited in claim 10 wherein said marking means includes a timing circuit responsive to the second signal to mark the record material only once after the movement of the film stops.

12. The recording apparatus as recited in claim 11 wherein said marking means includes means responsive to said timing circuit for providing a high-voltage spark to mark the record material.

* * * * *